Patented Dec. 18, 1951

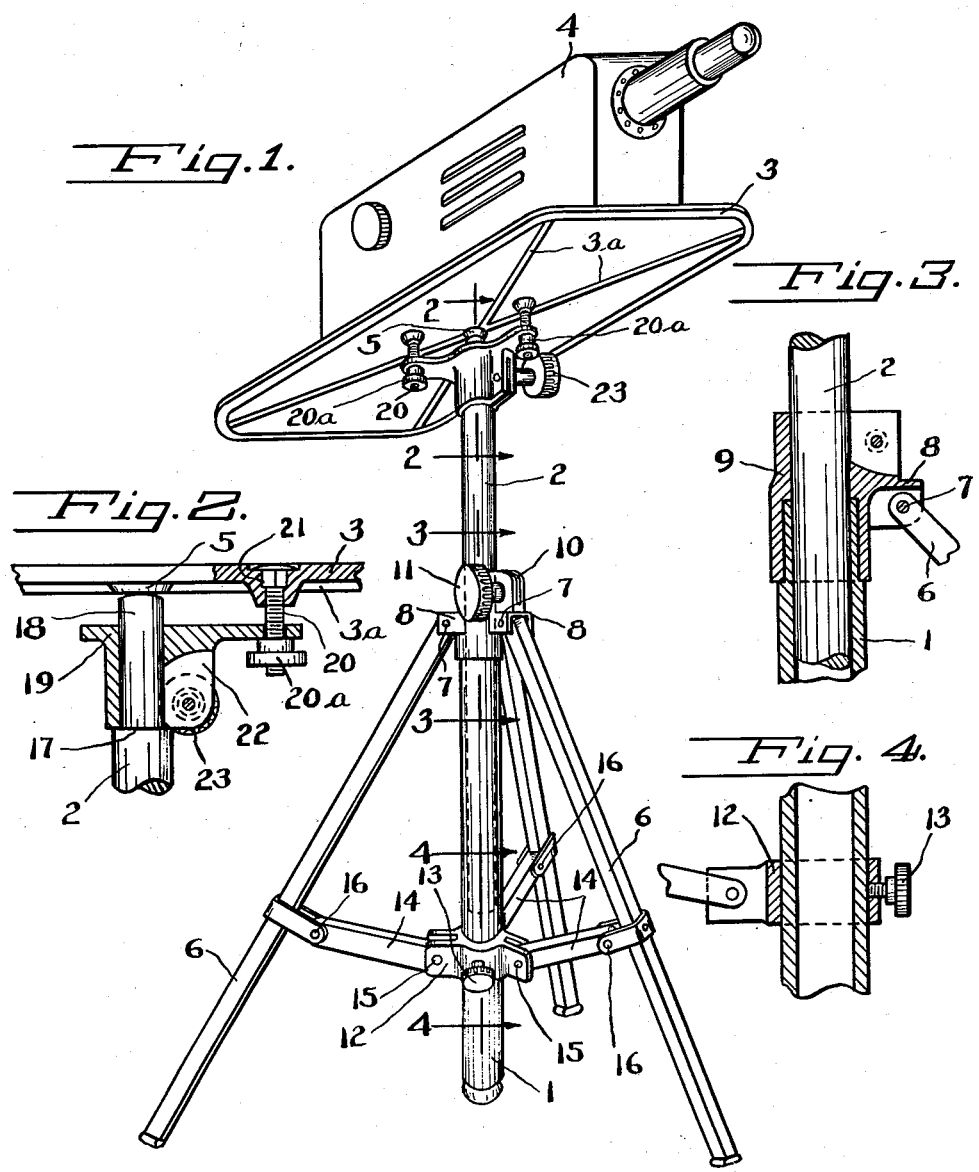

2,579,348

UNITED STATES PATENT OFFICE 2,579,348

SUPPORT FOR TABLE FOR PROJECTORS OR THE LIKE

James Y. Taylor, Garland, Tex.

Application June 2, 1947, Serial No. 751,852

2 Claims. (Cl. 248—178)

This invention relates to a new and improved table or support which is adapted for the support of projectors or the like.

The principal object and advantage of the invention is to provide a table or support of the type set forth which is relatively compact, light weight and portable while having the advantages of rigidity and being capable of firmly and securely supporting considerable weight and which may be easily and quickly adjusted in practically all directions to properly position the projector and which also enables the operator to pivot or swing around the table top and projector easily and quickly in order to get the projected image on the projection screen without having to turn or twist the table itself.

Other objects and advantages of the invention will be apparent from the following description taken in connection with the accompanying drawings. It will be understood that many changes may be made in the details of construction and arrangement of parts without departing from the scope of the invention as expressed in the accompanying claims. I, therefore, do not wish to be limited to the exact details of construction and arrangement of parts shown and described, as the preferred form has been given by way of illustration only.

Referring to the drawings:

Fig. 1 is a perspective view of a device embodying the invention;

Fig. 2 is a fragmentary sectional view taken on line 2—2 of Fig. 1 looking in the direction of the arrows;

Fig. 3 is a fragmentary sectional view taken on line 3—3 of Fig. 1 looking in the direction of the arrows; and Fig. 4 is a fragmentary sectional view taken on line 4—4 of Fig. 1 looking in the direction of the arrows.

Referring more particularly to the drawings wherein similar reference characters designate corresponding parts throughout the several views, the device shown embodying the invention comprises a tubular center leg or support 1, a support 2 in telescoping relation with said support 1 and the table top or projector support 3 adapted to support a projector or the like 4 which is shown by way of illustrating a possible use of the device.

The table top or support 3 is formed with the reinforcing ribs 3a extending diagonally across its under side and at their junction is formed the boss 5. If desired, the ribs 3a and boss 5 might be omitted.

The center leg or support 1 is adapted to be maintained in an upright position by the tripod composed of three or more supports 6 each of which is pivotally connected at its upper end at 7 to a projection 8 on the clamp 9 having the split collar 10 adapted to be adjusted by the knurled hand wheel 11 to clamp the support 2 in desired position relative to the leg or support 1 and thereby lock the table 3 at desired height.

The center leg or support 1 is adapted to rest upon the floor and the tripod legs 6 are spread out or opened to support the center leg 1 in upright position and these tripod legs 6 are locked in position by the clamp 12 which may be locked in position on the center leg 1 by suitable means such as the set screw 13 or a spring pressed pin could extend into an opening in the leg 1. The tripod legs 6 are each connected to the clamp 12 by the arms 14 which are each pivotally connected at 15 adjacent one end to the clamp 12 and adjacent their opposite ends are pivotally connected at 16 to one of the tripod legs 6.

Because of these pivotal connections the small tripod legs 6 can be so positioned as to take care of any floor irregularities and then locked in position.

For supporting a light weight projector it is not necessary that the center leg rest on the floor. However, when it does rest on the floor, additional rigidity is obtained and also the table is then capable of supporting much greater loads.

Adjacent the upper end of the support or tube 2 is a shoulder 17 and reduced extension 18 adapted to engage at its upper end the boss 5 on the table top 3 or if the boss is omitted to directly engage the lower surface of the table top 3 and support the same.

On the shoulder 17 is positioned the adjusting plate 19 having openings through which are positioned a plurality of bolts 20 of which three are employed in the form of the invention shown, with one of said bolts extending through an opening in each of the three projecting portions of the adjusting plate 19.

While three such bolts are shown, additional bolts could be employed if desired. These bolts 20 are each loosely fixed in top 3 extending through an opening 21 therein and through an opening in adjusting plate 19 and engaged by threaded nut 20a which, when tightened, will pull top 3 more closely to adjusting plate 19. The other nuts 20a can then be tightened to position table top 3 at any desired angle.

By adjusting these bolts 20 by means of nuts 20a, the table top 3 may be adjusted or tilted to desired angle.

The adjusting plate 19 is provided with a split collar 22 which may be tightened or loosened by knob 23 and when this knob is loosened, it is possible for the operator to swing the table top 3 and projector 4 around to desired angle to get the picture on the projection screen without having to twist the table supports or tripod, after which knob 23 may be tightened to lock the table top 3 in desired angular position.

From the foregoing it will be seen that I have provided simple, efficient and economical means for obtaining all of the objects and advantages of the invention.

Having described my invention, I claim:

1. In a device of the character described, an upright supporting post having a reduced portion at its upper end providing an annular shoulder, a collar pivotally mounted on said reduced portion and supported on said shoulder and adapted to rotate in a horizontal plane, means for locking said collar in any of its horizontally rotatable positions, said collar having circumferentially spaced outwardly extending horizontal portions provided with openings through their outer ends, a table top supported directly on the upper end of said reduced portion and having openings aligned with the openings in said horizontally extending portions of said collar, screws extending through the aligned openings for adjusting the angularity of said table, a tubular member for receiving said supporting post in telescoping engagement, a tripod for supporting said tubular member in an upright position, and means for vertically adjusting said supporting post with respect to said tubular member and tripod, and means for clamping said parts in adjusted position.

2. In a device of the character described, an upright supporting post having a reduced portion at its upper end providing an annular shoulder, said reduced portion having a rounded upper end, a collar pivotally mounted on said reduced portion and supported on said shoulder and adapted to rotate in a horizontal plane, means for locking said collar in any of its horizontally rotatable positions, said collar having circumferentially spaced outwardly extending horizontal portions provided with openings through their outer ends, a table top provided with a flat-face reinforcing boss on its under side in contact with and supported directly on the upper rounded end of said reduced portion and having countersunk openings aligned with the openings in said horizontally extending portions of said collar, screws supported in said openings in the table top with their heads flush with the upper face of said top and extending through the aligned openings of said horizontally extending portions for adjusting the angularity of said table, a tubular member for receiving said supporting post in telescoping engagement, a tripod for supporting said tubular member in an upright post with respect to said tubular member and tripod, and means for clamping said parts in adjusted position.

JAMES Y. TAYLOR.

REFERENCES CITED

The following references are of record in the file of this patent:

UNITED STATES PATENTS

| Number | Name | Date |
|---|---|---|
| 202,713 | Everett | Apr. 23, 1878 |
| 280,203 | McCurry | June 26, 1883 |
| 730,830 | Lingle | June 9, 1903 |
| 761,219 | Goodwin | May 31, 1904 |
| 918,859 | Hammerschlag | Apr. 20, 1909 |
| 1,030,938 | Stamps | July 2, 1912 |
| 1,059,192 | Mills | Apr. 15, 1913 |
| 1,112,935 | Rial et al. | Oct. 6, 1914 |
| 1,151,549 | Shade | Aug. 24, 1915 |
| 1,517,825 | Bruneau | Dec. 2, 1924 |
| 1,571,440 | Smith | Feb. 2, 1926 |
| 1,844,113 | Beidler et al. | Feb. 9, 1932 |